United States Patent [19]
Nguyen et al.

[11] Patent Number: 4,635,139
[45] Date of Patent: Jan. 6, 1987

[54] ASPERITY BURST WRITER

[75] Inventors: Son V. Nguyen, Rochester; James M. Severson, Byron, both of Minn.

[73] Assignee: International Business Machines Corporation, Armonk, N.Y.

[21] Appl. No.: 769,276

[22] Filed: Aug. 26, 1985

[51] Int. Cl.⁴ .................. G11B 5/02; G11B 27/36; G05F 1/00
[52] U.S. Cl. ..................... 368/25; 324/212; 360/31
[58] Field of Search .................. 324/210, 212, 213; 360/28, 31, 137, 133, 135

[56] References Cited

U.S. PATENT DOCUMENTS 2,937,368  5/1960  Newby ........................... 324/212
3,781,835 12/1973  Dion et al. ...................... 360/25
4,532,802  8/1985  Yeack-Scranton et al. ...... 324/212

Primary Examiner—Vincent P. Canney
Attorney, Agent, or Firm—Robert W. Lahtinen

[57] ABSTRACT

A glide head is used to test a rigid magnetic disk surface for projecting asperities. Using a two rail head with the read/write transducer mounted at the rear of the rail at the side of the head toward which the head is being radially advanced and skewing the head so that the trailing edge of the head approaches each track before the leading edge as the head is advanced, it is possible to write a pattern from a known position relative an event or asperity identified by a mechanical transducer associated with the head to the index location. Using a developer, it is then possible to readily identify the asperity during microscopic examination of the disk surface.

3 Claims, 4 Drawing Figures

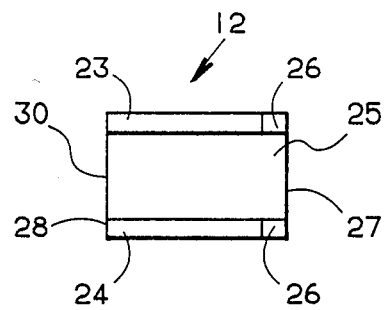
FIG. 2
FIG. 3
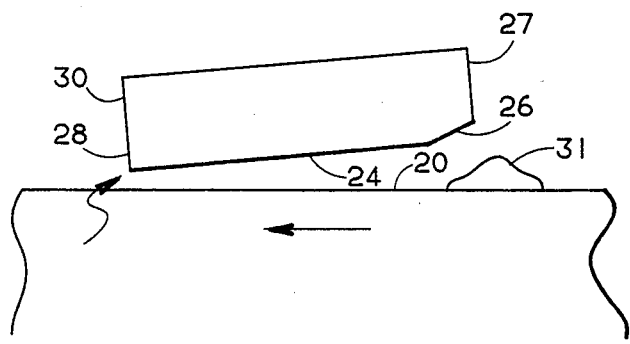
FIG. 4
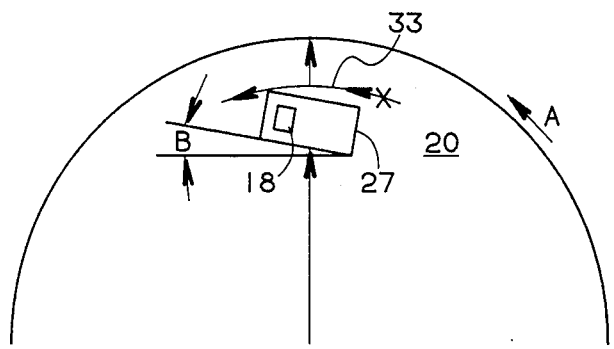

ASPERITY BURST WRITER

BACKGROUND OF THE INVENTION

This invention pertains to disk storage devices and more particularly to rigid magnetic disks for use in such devices.

In rigid magnetic disk drives, glide heads are used to identify disks with mechanical projections high enough above the surface to contact the data head during normal file operation. Currently available products are concerned when projections or asperities have a height of 5 microinches or greater. To identify asperity causes and take corrective action it is necessary to locate these sites on the disk surface. A tester using glide heads can accurately give the angular and radial position of the glide head when an asperity contacts the head. The uncertainty of the asperity location relative to these coordinates is caused by the rail area on the glide head, the accuracy of the actual coordinates and the relocating tolerances in taking the disk from the glide tester to a microscope viewing station. When the area of the asperity becomes very small (about 4 micrometers in diameter), it becomes nearly impossible to repeatedly locate the defect in this relatively large uncertainty zone.

Although this problem is difficult at present, it will become more severe in the future as the bit and track densities on magnetic disks are increased. Such increased densities will require thinner magnetic coatings and lower transducer head flyheights which will require that the maximum tolerable asperity be less. Accordingly, the projections which require identification will be smaller.

SUMMARY OF THE INVENTION

By attaching a glide transducer to a thin film magnetically active head, asperity locations can be burst written. This is similar to the technique used to identify magnetic defect locations, except now the glide transducer indicates when a defect occurs. Burst writing utilizes a disk magnetic tester to record the exact bit locations of an event on a disk (in this case an asperity). A constant frequency flux pattern is then written from that location to the index location on the disk surface. This flux pattern is then developed and viewed under a microscope, the beginning of the flux pattern indicating where the event occurred. For magnetic defects, the defect is coincident with the beginning of the flux pattern on the track since the read/write element detects the defect. For asperities, the defect is not coincident with the beginning of the flux pattern on the track, but the burst pattern can still be utilized to locate the defect.

By moving the head in small increments (such as 0.1 millimeter), burst written tracks result across the entire rail width. The defect will be centered in this track cluster. The uncertainty of the asperity location relative to the beginning of the burst written pattern on the track is related to where the asperity hits the rail. By skewing the head slightly so that the leading edge of the slider is away from the direction of advance, the first time the asperity encounters the head, it will be near the trailing edge and closely proximate the transducer. As the head flies with an attitude wherein the leading edge is higher than the trailing edge, the asperity will also have a tendency to first encounter the trailing edge. Experience has shown that the ends of the track bursts can be made to be closely proximate the asperity location.

BRIEF DESCRIPTION OF THE DRAWING

FIG. 2 is a bottom view of a typical two rail slider used to practice the present invention showing the air bearing surfaces and the intermediate etched or recessed surface.

FIG. 3 is a side elevation of the head and disk surface showing the inclined attitude of the head during flight.

FIG. 4 is a view of a disk surface and cooperating glide head which is skewed as taught in the practice of this invention.

DETAILED DESCRIPTION

Figure 1:
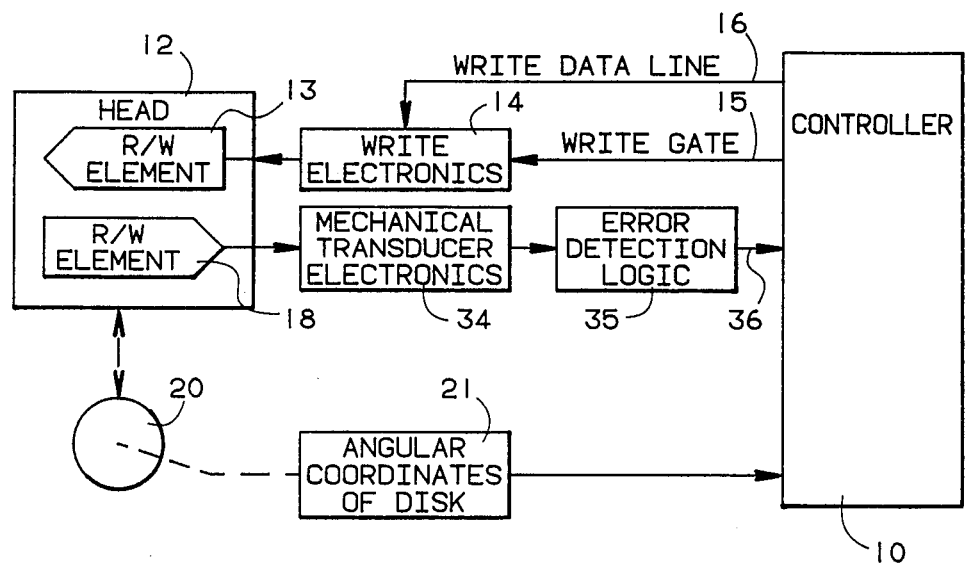
FIG. 1 is a schematic block diagram of the mechanical and electrical hardware used to practice the present invention.

As seen in FIG. 1, the test system includes a controller 10 which receives signals, records data and issues the appropriate commands. The head 12 includes a read write element 13 which for the purpose of this invention is provided with write electronics 14 controlled from processor 10 by a write gate on line 15 and is supplied with information on a write data line 16. In addition there is a mechanical transducer 18 which may be mounted on the head or slider or elsewhere to sense shock or vibration encountered by head 12. The disk, with surface 20 over which head 12 flies on a film of air, is mounted on a shaft or spindle which is associated with electronics 21 that provide the angular coordinates of the disk at any time during operation so that controller 10 may ascertain and record the disk angular position whenever an event occurs.

The head 12 in FIG. 2 is viewed from the bottom or surface which confronts the disk surface. The head presents two rails or air bearing surfaces 23, 24 and a central recessed surface 25. The forward portions of the rails have an inclined portion 26 adjacent the leading edge 27 of the head. A thin film transducer 28 is mounted at the rear of rail 24. The actual size of a typical head of the type currently in use is 4 millimeters in length and 3 millimeters in width with the rails being 0.4 millimeters wide. The read/write gap is approximately 0.025 millimeters in width and much smaller in gap length (in the direction of relative movement between head and disk surface track).

As illustrated in FIG. 3, the head 12 normally flies over the disk surface 20 in an inclined position with the leading edge 27 slightly higher than the trailing edge 30. Accordingly, the location of contact between the head rail and an asperity 31 will occur at varying positions in relation to asperity height. The rail at the side of the head in the direction of radial access will make first contact with each asperity.

The skewed position of the head is schematically shown in FIG. 4 where the side rotates as shown by the arrow A and the head is advanced radially outward during a glide test sequence. The skew angle B causes the trailing edge 30 of the head to first approach each track, such as track 33, at the side of the head where the side rail 24 carries the transducer 28. The side rail is thus nearest an asperity location that causes the mechanical transducer 18 to be actuated or generate a signal. The inclined attitude in flight and the skewed orientation of head 12 each contribute to placing transducer 28 more closely proximate the asperity location when the mechanical transducer 18 first signals the presence of an asperity.

The mechanical transducer 18 is most typically a piezoelectric transducer which is intimately bonded to the upper surface of the head or transducer 12. This requires that additional leads be attached to the head which must be carefully designed and implemented to avoid impairment of the aerodynamic characteristics of the head. This problem can be overcome by having the mechanical transducer mounted on the load beam or the arm on which the head is supported. However, by avoiding the problems associated with mounting the mechanical transducer on the head, it is necessary to accept diminished sensitivity and effectiveness of the transducer.

In operation, head 12 is advanced from the radially inward home position beyond track zero to the outermost radius over which the product head will fly. With the inclined head having the trailing edge 30 lower than leading edge 27 and maintaining the skewed head positioning, the rear portion of the leading side rail 24 tends to first approach each asperity. The head is advanced track by track over the surface 20 until a signal from mechanical transducer 18 indicates the presence of an asperity. When the mechanical transducer electronics 34 and the error detecting logic 35 signal on line 36 the presence of an asperity, controller 10 records the angular coordinate supplied by logic 21 and permits another rotation to be taken on the current track. When the coordinate is again reached, the write gate (line 15) is enabled and the write data line 16 supplies a continuous burst written signal from the coordinate to the index location on disk surface 20.

After the glide head 12 has traversed the disk surface, a developer is applied to the surface and the disk is subjected to microscopic examination. The developer is a colloidal solution of slightly magnetic or paramagnetic particles which align over the flux path established by the burst written track portion on the otherwise AC demagnetized state of the disk magnetic surface 20. The burst written portion of the track is initiated at a known distance from the event or asperity to permit the asperity to be readily identified. This distance can be made large enough to prevent the developer overlie which can partially obscure the asperity.

What is claimed is:

1. Apparatus for testing a magnetic recording surface for asperities comprising
   a glide head which travels over the magnetic surface on a film of air;
   said glide head being skewed at an acute angle to the magnetic surface track to permit the trailing edge of the slider to first approach each track in the direction of glide head access;
   a transducer attached to said glide head and adapted to selectively write on said surface;
   non-magnetic detecting means for ascertaining when said glide head overlies an asperity on the magnetic surface; and
   means for writing a pattern of data on a portion of the current track beginning when said detecting means indicates that said glide head overlies an asperity, whereby said magnetic surface may be analyzed by examining the asperity that is positioned adjacent the start of a written pattern.

2. The method of locating and identifying the position of an asperity on a rigid magnetic surface having parallel data tracks thereon using a glide head with a transducer attached thereto comprising the steps of
   a. skewing said glide head to cause the trailing edge of said glide head to first overlie an asperity encountered in the direction of head access movement,
   b. accessing said glide head over said surface from track to track,
   c. identifying when an asperity has been encountered adjacent the glide head,
   d. writing a pattern of data on the associated track when the asperity is encountered, and
   e. examining the magnetic surface by identifying the asperities which occur adjacent the beginning of the pattern of data.

3. The method of locating and identifying the position of an asperity on a rigid magnetic disk of claim 2 wherein the examination of said magnetic surface comprises
   applying a developer to the surface scanned by said glide head and
   microscopically examining the scanned surface to identify asperities from the written pattern of said developed surface.

* * * * *